United States Patent
Henda et al.

[11] Patent Number: 5,851,249
[45] Date of Patent: Dec. 22, 1998

[54] PARTICULATE TRAP FOR A DIESEL ENGINE

[75] Inventors: Yoshimitu Henda, Numazu; Kiyoshi Kobashi, Mishima; Yoshimasa Watanabe, Sunto-gun; Yasushi Araki, Susono; Youichi Nagai; Syunsuke Ban, both of Itami, all of Japan

[73] Assignees: Toyota Jidosha Kabushiki Kaisha, Toyota; Sumitomo Electric Industries, Ltd., Osaka, both of Japan

[21] Appl. No.: 898,861

[22] Filed: Jul. 23, 1997

[30] Foreign Application Priority Data

Jul. 25, 1996 [JP] Japan ................... 8-196456

[51] Int. Cl.$^6$ ............ B01D 29/07; B01D 46/00
[52] U.S. Cl. ................ 55/486; 55/498; 55/521; 55/DIG. 30
[58] Field of Search .............. 55/486, 497, 498, 55/521, DIG. 10, DIG. 30

[56] References Cited

U.S. PATENT DOCUMENTS

| | | | |
|---|---|---|---|
| 4,439,321 | 3/1984 | Taki et al. | 55/521 X |
| 4,486,206 | 12/1984 | Miyakawa et al. | 55/498 X |
| 4,710,297 | 12/1987 | Suzuki et al. | 55/498 X |
| 4,938,869 | 7/1990 | Bayerlein et al. | 55/521 X |
| 5,130,100 | 7/1992 | Serizawa | 422/180 |
| 5,174,969 | 12/1992 | Fischer et al. | 55/486 X |
| 5,298,046 | 3/1994 | Peisert | 55/486 |
| 5,304,351 | 4/1994 | Tanaka et al. | 55/498 X |
| 5,456,069 | 10/1995 | Haerle | 55/498 |
| 5,562,825 | 10/1996 | Yamada et al. | 210/321.74 |
| 5,611,831 | 3/1997 | Matsuoka et al. | 55/486 |
| 5,660,606 | 8/1997 | Adamini | 55/498 X |
| 5,709,722 | 1/1998 | Nagai et al. | 55/DIG. 30 |
| 5,720,787 | 2/1998 | Kasai et al. | 55/DIG. 10 |

FOREIGN PATENT DOCUMENTS

| | | | |
|---|---|---|---|
| 559 907 | 9/1993 | European Pat. Off. | |
| 593 004 | 4/1994 | European Pat. Off. | |
| 59-022619 | 2/1984 | Japan | 55/498 |
| 62-149316 | 7/1987 | Japan | |
| 62-216619 | 9/1987 | Japan | 55/498 |
| 7-51522 | 2/1995 | Japan | |

*Primary Examiner*—Robert Spitzer
*Attorney, Agent, or Firm*—Oliff & Berridge, PLC

[57] ABSTRACT

A particulate trap for a diesel engine in which at least two nonwoven sheets made of heat-durable metallic fibers and at least two corrugated plates made of heat-durable metal having a width smaller than that of the nonwoven sheets are alternately overlaid in the thicknesswise direction with each other in a spiral manner, and one surface of one of the nonwoven sheets and one surface of the other of the nonwoven sheets are in close contact and are continuously welded to each other along the upstream edges thereof as seen from the flowing direction of the exhaust gas so that a first space closed along the upstream edges and opened along the downstream edges is formed between the nonwoven sheets via one of the corrugated plates, and the other surface of the one nonwoven sheet and the other surface of the other nonwoven sheet are in close contact and are continuously welded to each other along the down stream edges thereof as seen from the flowing direction of the exhaust gas so that a second space closed along the downstream edges and opened along the upstream edges is formed between the nonwoven sheets via the other of the corrugated plates, is disclosed. In the particulate trap, the difference in width between the nonwoven sheet and the corrugated plate is larger in a central zone of the particulate trap than in the circumferential zone thereof.

8 Claims, 5 Drawing Sheets

PARTICULATE TRAP FOR A DIESEL ENGINE

BACKGROUND OF THE INVENTION

1. Field of the Invention

The present invention relates to a particulate trap for a diesel engine.

2. Description of the Related Art

Exhaust gas from a diesel engine contains harmful particulates mainly composed of carbon, which must be removed and not discharged into the atmosphere. For this purpose, a particulate trap is provided in an exhaust system of a diesel engine. Since such a particulate trap causes a large exhaust resistance as the amount of trapped particulates increases, it is necessary to periodically burn the trapped particulates, using heat of the exhaust gas or the like, so that the particulate trap is regenerated.

Accordingly, the particulate trap is required to be excellent in its temperature-up characteristic and its thermal durability. Japanese Unexamined Patent Publication (Kokai) No. 7-51522 discloses a particulate trap made from a nonwoven sheet of heat-durable metallic fibers.

Basically, the particulate trap is required to have a sufficient exhaust-gas permeability and mechanical strength. Since the metallic fiber nonwoven sheet itself does not have a high rigidity, it is impossible to construct a particulate trap having a sufficient exhaust-gas permeability and mechanical strength by the metallic fiber nonwoven sheet alone. Therefore, it is proposed to construct the particulate trap by using a corrugated plate made of heat-durable metal having a sufficient rigidity together with the metallic fiber nonwoven sheet.

Generally speaking, as shown in FIGS. 1 and 2, this particulate trap has a structure wherein two metallic fiber nonwoven sheets and two corrugated plates, having a shorter width than that of the metallic fiber nonwoven sheets, are alternately overlaid in a spiral manner in the thicknesswise direction. In this particulate trap, one surface of one metallic fiber nonwoven sheet and one surface of the other sheet are closely in contact and continuously welded with each other along the upstream edges thereof as seen in the flowing direction of the exhaust gas so that a first space closed along the upstream edges and opened along the downstream edges is formed between the two metallic fiber nonwoven sheets via one corrugated plate. On the other hand, the other surface of one metallic fiber nonwoven sheet and the other surface of the other sheet are closely in contact and continuously welded with each other along the down stream edges thereof as seen in the flowing direction of the exhaust gas so that a second space closed along the downstream edges and opened along the upstream edges is formed between the two metallic fiber nonwoven sheets via the other corrugated plate.

This particulate trap is capable of trapping particulates in the metallic fiber nonwoven sheet when the exhaust gas flowing in the second space from the upstream side passes through the metallic fiber nonwoven sheet in the thicknesswise direction into the first space. Thus, this particulate trap is excellent in temperature-up characteristic and heat-durability and has sufficient exhaust-gas permeability and mechanical strength.

However, in this particulate trap, a welded part between the metallic fiber nonwoven sheets in a central zone is bent to have a small radius of curvature and thus an extremely large bending stress is generated therein. Whereby the welding part is liable to be easily broken as shown by an arrow in FIG. 3 which is an enlarged view of the central zone in FIG. 1, resulting in the communication of the first space with the upstream side open and that of the second space with the downstream side open in the central zone. Thereby, the particulates in the exhaust gas passing through the central zone cannot be trapped so that the particulate-trapping efficiency deteriorates.

SUMMARY OF THE INVENTION

Therefore, an object of the present invention is to realize a high particulate-trapping efficiency in a particulate trap for a diesel engine having a structure wherein at least two nonwoven sheets made of heat-durable metallic fibers and at least two corrugated plates made of heat-durable metal are alternately overlaid in the thicknesswise direction with each other in a spiral manner.

According to the present invention, there is provided a first particulate trap for a diesel engine, wherein at least two nonwoven sheets made of heat-durable metallic fibers and at least two corrugated plates made of heat-durable metal having a width smaller than that of the nonwoven sheets are alternately overlaid in the thicknesswise direction with each other in a spiral manner, and one surface of one of the nonwoven sheets and one surface of the other of the nonwoven sheets are closely in contact and continuously welded with each other along the upstream edges thereof as seen in the flowing direction of the exhaust gas so that a first space closed along the upstream edges and opened along the downstream edges is formed between the nonwoven sheets via one of the corrugated plates, and the other surface of the one nonwoven sheet and the other surface of the other nonwoven sheet are closely in contact and continuously welded with each other along the down stream edges thereof as seen in the flowing direction of the exhaust gas so that a second space closed along the downstream edges and opened along the upstream edges is formed between the nonwoven sheets via the other of the corrugated plates, characterized in that the difference in width between he nonwoven sheet and the corrugated plate is larger in a central zone of the particulate trap than in the circumferential zone thereof.

According to the present invention, there is provided a second particulate trap for a diesel engine, wherein at least two nonwoven sheets made of heat-durable metallic fibers and at least two corrugated plates made of heat-durable metal having a width smaller than that of the nonwoven sheets are alternately overlaid in the thicknesswise direction with each other in a spiral manner, and one surface of one of the nonwoven sheets and one surface of the other of the nonwoven sheets are closely in contact and continuously welded with each other along the upstream edges thereof as seen in the flowing direction of the exhaust gas so that a first space closed along the upstream edges and opened along the downstream edges is formed between the nonwoven sheets via one of the corrugated plates, and the other surface of the one nonwoven sheet and the other surface of the other nonwoven sheet are closely in contact and continuously welded with each other along the down stream edges thereof as seen in the flowing direction of the exhaust gas so that a second space closed along the downstream edges and opened along the upstream edges is formed between the nonwoven sheets via the other of the corrugated plates, characterized in that a wave-height of the corrugated plate is smaller in the central zone of the particulate trap than in the circumferential zone thereof.

According to the present invention, there is provided a third particulate trap for a diesel engine, wherein at least two nonwoven sheets made of heat-durable metallic fibers and at least two corrugated plates made of heat-durable metal having a width smaller than that of the nonwoven sheets are alternately overlaid in the thicknesswise direction with each other in a spiral manner, and one surface of one of the nonwoven sheets and one surface of the other of the nonwoven sheets are closely in contact and continuously welded with each other along the upstream edges thereof as seen in the flowing direction of the exhaust gas so that a first space closed along the upstream edges and opened along the downstream edges is formed between the nonwoven sheets via one of the corrugated plates, and the other surface of the one nonwoven sheet and the other surface of the other nonwoven sheet are closely in contact and continuously welded with each other along the down stream edges thereof as seen in the flowing direction of the exhaust gas so that a second space closed along the downstream edges and opened along the upstream edges is formed between the nonwoven sheets via the other of the corrugated plates, characterized in that a welded length of the nonwoven sheets in the flowing direction of the exhaust gas is longer in the central zone of the particulate trap than in the circumferential zone thereof.

The present invention will be more fully understood from the description of preferred embodiments of the invention set forth below, together with the accompanying drawings.

DESCRIPTION OF THE PREFERRED EMBODIMENT

Figure 1:
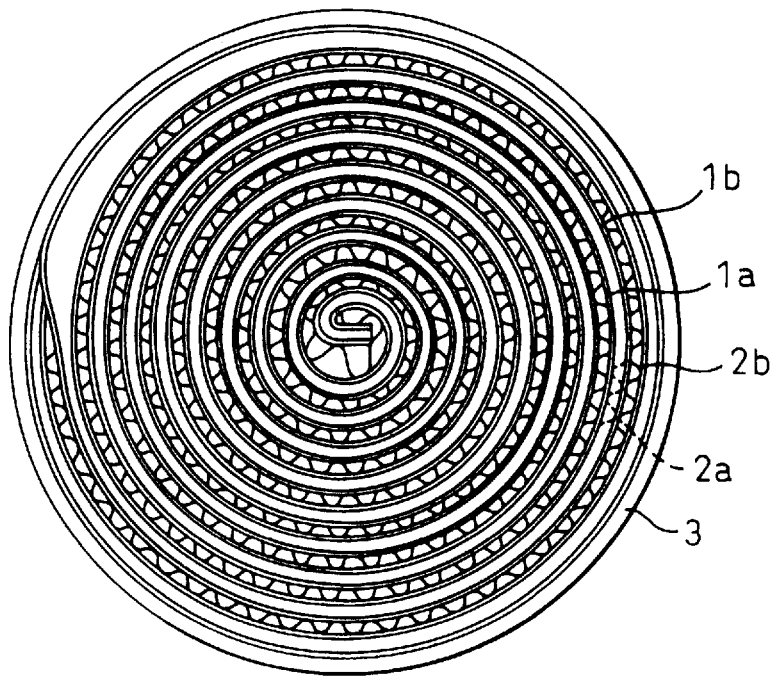
FIG. 1 is a front view of a particulate trap of a usual type for a diesel engine.
Figure 2:
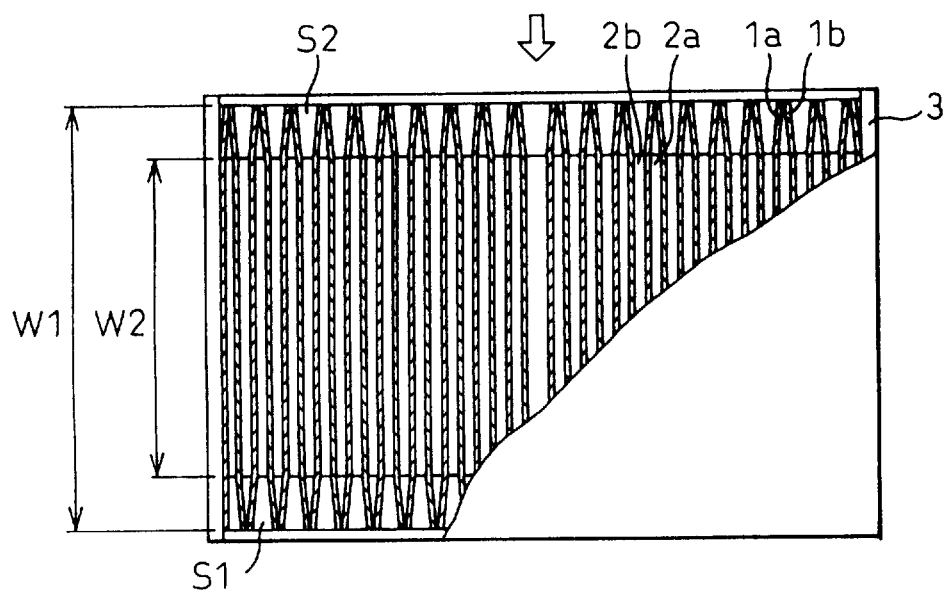
FIG. 2 is a partially sectioned side view of the particulate trap shown in FIG. 1.
Figure 3:
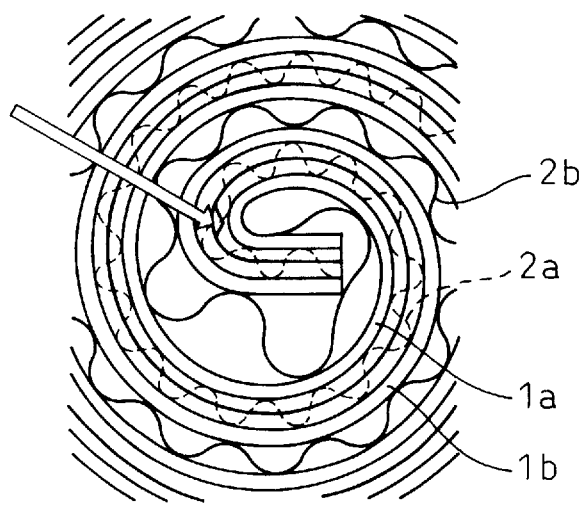
FIG. 3 is an enlarged view of a central zone of the particulate trap shown in FIG. 1.

FIG. 1 is a front view of a conventional particulate trap for a diesel engine constructed of nonwoven sheets made of heat-durable metallic fibers and corrugated plates made of heat-durable metal. FIG. 2 is a partially-sectioned side view of FIG. 1. As shown in these figures, a body of this particulate trap is constructed by a pair of nonwoven sheets $1a$, $1b$ and a pair of corrugated plates $2a$, $2b$ alternately overlaid with each other in the thicknesswise direction in a spiral manner. The heat-durable metallic fiber composing the nonwoven sheet and the metal forming the corrugated plate may be an alloy of Fe—Cr—Al or Ni—Cr—Al. The particulate trap thus structured is accommodated in a cylindrical casing 3. In such a manner, the body of the particulate trap is formed from the nonwoven sheet $1a$, $1b$ of heat-durable metallic fibers and the corrugated plates $2a$, $2b$ of heat-durable metal, whereby the particulate trap is excellent in temperature-up characteristic and heat-durability when the same is regenerated.

A width W2 of the corrugated plate $2a$, $2b$ is smaller than that W1 of the nonwoven sheet $1a$, $1b$. One surface of one nonwoven sheet la and one surface of the other sheet $1b$ are closely in contact and continuously welded with each other along the upstream edges thereof as seen in the flowing direction of an exhaust gas to be treated shown in an arrow, whereby a first space S1 is formed between the two nonwoven sheets $1a$ and $1b$ via one corrugated plate $2a$, which is closed along the upstream edges and opened along the downstream edges. On the other hand, the other surface of one nonwoven sheet $1a$ and the other surface of the other nonwoven sheet $1b$ are closely in contact and continuously welded with each other along the downstream edges thereof as seen in the flowing direction of the exhaust gas, whereby a second space S2 is formed between the two nonwoven sheets $1a$ and $1b$ via the other corrugated plate $2b$, which is closed along the downstream edges and opened along the upstream edges.

This particulate trap has a sufficient exhaust-gas permeability, because the exhaust gas to be treated flows into the second space S2 from the exterior on the upstream side, then passes through the nonwoven sheets $1a$ and $1b$ in the radial direction into the first space S1, and finally flows out from the first space S1 to the exterior on the downstream side. In such a manner, the corrugated plates $2a$, $2b$ can provide the particulate trap not only with a favorable exhaust-gas permeability but also with a sufficient mechanical strength although the nonwoven sheets $1a$, $1b$ have an inferior rigidity.

Figure 4:
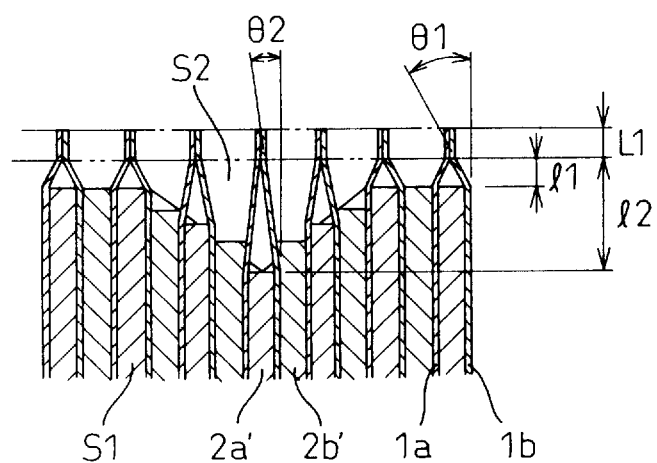
FIG. 4 is an enlarged sectional view of a welded part between two nonwoven sheets according to a first embodiment of the present invention.
Figure 5:
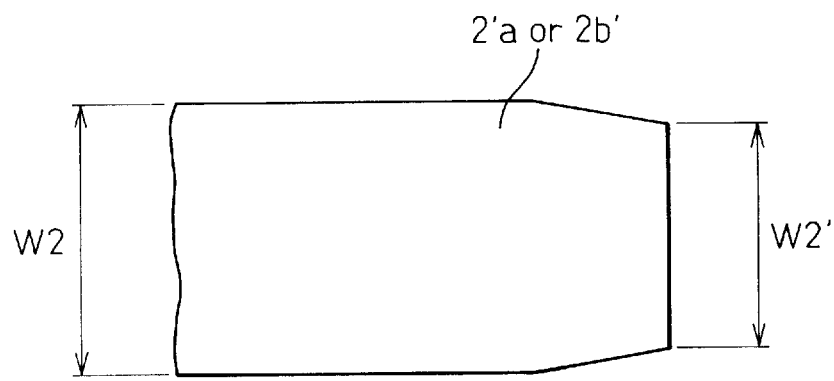
FIG. 5 is a diagrammatic developed plan view of a corrugated plate used for the first embodiment of the present invention.

The present invention is the improvement of the welded part between both the nonwoven sheets in the conventional particulate trap having the above structure. FIG. 4 is an enlarged sectional view of a welded part between nonwoven sheets according to a first embodiment of the present invention. As stated before, the two nonwoven sheets $1a$ and $1b$ are closely in contact and welded with each other along the downstream and upstream edges as seen in the flowing direction of the exhaust gas. A length of the welded part is shown by L1. In this embodiment, the two nonwoven sheets $1a$ and $1b$ have a constant width throughout the length thereof, but the two corrugated plates $2a'$ and $2b'$ have a width smaller in the central zone of the particulate trap than in the circumferential zone thereof. FIG. 5 is a diagrammatic developed-plan view of the corrugated plates $2a'$ and $2b'$ of this embodiment, wherein a width W2' thereof positioned in the central zone of the particulate trap is smaller than that W2 positioned in the circumferential zone.

According to such a structure, a bending angle θ2 of the nonwoven sheets in the central zone of the particulate trap, which angle is made when both the nonwoven sheets are closely in contact and welded with each other is smaller than a bending angle θ1 of the nonwoven sheets in the circumferential zone. Thereby, the residual stress due to the bending of the nonwoven sheets in the central zone of the particulate trap can be made small, and thus the welded part therein is hardly separated. In addition, a length l2 of a portion from the edge of the corrugated plate to the welded part of the nonwoven sheets in the central zone of the particulate trap becomes longer than a length l1 in the circumferential zone thereof. There is no corrugated plate in the portion, so that the longer this portion becomes, the higher the degree of freedom in the deformation thereof becomes. Thus, the welded part between both the nonwoven sheets in the central zone of the particulate trap according to this embodiment is separated with more difficulty than that in the prior art. Therefore, even though the two nonwoven sheets are spirally wound with a small radius of curvature, the welded part therebetween is not broken. If the length of the portion from the edge of the corrugated plate to the welded part is lengthened throughout the particulate trap, there is a risk in that vibration is generated in this portion to result in the breakage thereof because it easily deforms as stated before. The vibration is generated, for example, by vehicle vibration or other effects. Therefore, it is effective to lengthen this portion solely in the central zone of the particulate trap, as in this embodiment.

Figure 6:
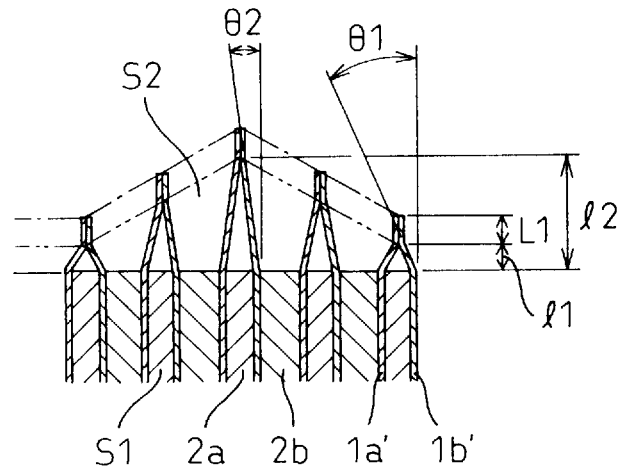
FIG. 6 is an enlarged sectional view of a welded part between two nonwoven sheets according to a second embodiment of the present invention.
Figure 7:
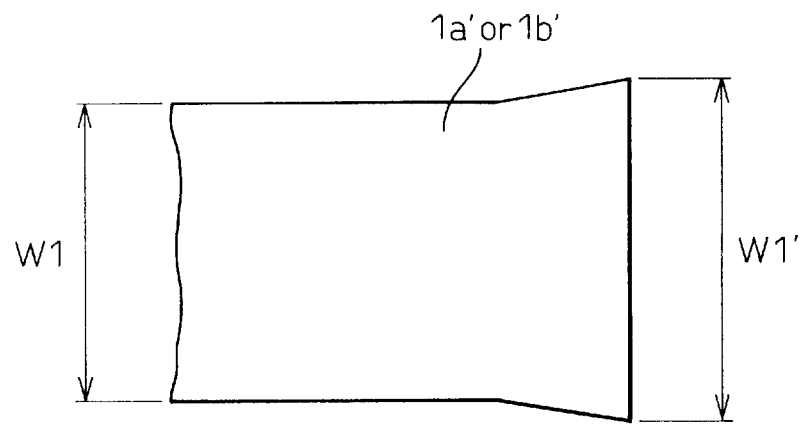
FIG. 7 is a diagrammatic developed plan view of a nonwoven sheet used for the second embodiment of the present invention.

FIG. 6 corresponds to FIG. 4, and illustrates a second embodiment of the present invention. In this embodiment, two corrugated plates $2a$, $2b$ have a constant width, but two nonwoven sheets $1a'$, $1b'$ have a larger width in the central zone of the particulate trap than in the circumferential zone thereof. FIG. 7 is a diagrammatic developed-plan view of the nonwoven sheets $1a'$ and $1b'$, wherein a width W1' of the nonwoven sheets positioned in the central zone is larger than the width W1 in the circumferential zone.

Also in this structure, it is possible to make the bending angle $\theta2$ of the nonwoven sheets in the central zone of the particulate trap smaller than the angle $\theta1$ in the circumferential zone, when both are welded together. In addition, a length l2 of the portion from the edge of the corrugated plate to the welded part of the nonwoven sheets in the central zone of the particulate trap is longer than length l1 in the circumferential zone thereof. Thus, similar to the first embodiment, the welded part between both the nonwoven sheets in the central zone of the particulate trap is hard to separate into individual nonwoven sheets even though they are spirally wound with a small radius of curvature.

Figure 8:
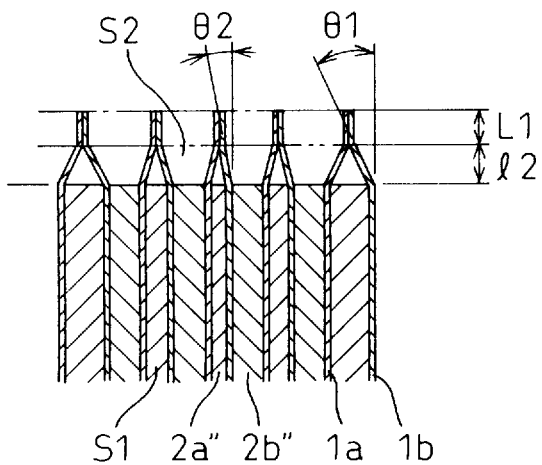
FIG. 8 is an enlarged sectional view of a welded part between two nonwoven sheets according to a third embodiment of the present invention;.
Figure 9:
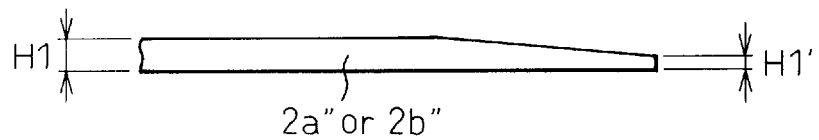
FIG. 9 is a diagrammatic side view of a corrugated plate used for the third embodiment of the present invention.

FIG. 8 corresponds to FIG. 4, and illustrates a third embodiment of the present invention. In this embodiment, two corrugated plates $2a''$, $2b''$ and two nonwoven sheets $1a$, $1b$ have a constant width, but the two corrugated plates $2a''$, $2b''$ have a smaller wave-height in the central zone of the particulate trap than in the circumferential zone thereof. FIG. 9 is a diagrammatic developed-side view of the corrugated plates $2a''$ and $2b''$, wherein a wave-height H1' of the corrugated plate positioned in the central zone is smaller than that H1 thereof positioned in the circumferential zone.

In this structure, it is possible to make the bending angle $\theta2$ of the nonwoven sheets in the central zone of the particulate trap smaller than that $\theta1$ thereof in the circumferential zone, when they both are welded together. Thus, the welded part between both the nonwoven sheets in the central zone of the particulate trap is hard to separate into individual nonwoven sheets even though they are spirally wound with a small radius of curvature.

Figure 10:
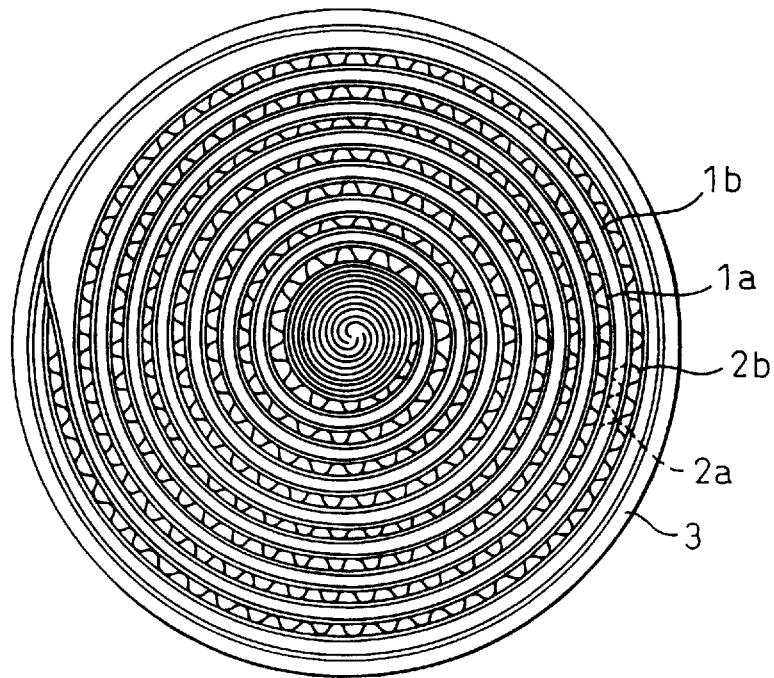
FIG. 10 is an illustration of a fourth embodiment of the present invention, corresponding to FIG. 1.

FIG. 10 corresponds to FIG. 1, and illustrates a fourth embodiment of the present invention. In this embodiment, a wave-height of the corrugated plate in the central zone of the particulate trap is smaller than that of the third embodiment, and becomes zero. In other words, the corrugated plate is eliminated in the central zone of the particulate trap. Thus, the central zone of the particulate trap is formed solely with the nonwoven sheets in this embodiment so that the above-mentioned spaces S1 and S2 allowing the exhaust gas to pass are not formed in the central zone. Therefore, the welding of both the nonwoven sheets is unnecessary in the central zone. The problem in which the welding part is broken does not occur.

Figure 11:
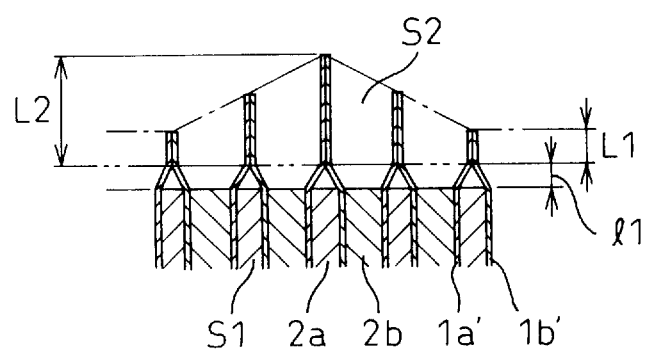
FIG. 11 is an enlarged sectional view of a welded part between two nonwoven sheets according to the fifth embodiment of the present invention.

FIG. 11 corresponds to FIG. 4, and illustrates a fifth embodiment of the present invention. In this embodiment, two nonwoven sheets $1a$, and $1b$, have a larger width in the central zone of the particulate trap than in the circumferential zone thereof. The difference between the present embodiment and the second embodiment is that a length L2 of the welded part between both the nonwoven sheets $1a'$ and $1b'$ in the central zone of the particulate trap is larger than that L1 in the circumferential zone thereof.

According to this structure, it is possible to reinforce the welded part in the central zone of the particulate trap more than in the circumferential zone thereof. Therefore, the welded part between both the nonwoven sheets in the central zone of the particulate trap is not separated to individual nonwoven sheets even though they are spirally wound with a small radius of curvature.

While the particulate trap is structured with two pairs of a nonwoven sheet and a corrugated plate in all of the above embodiments, the present invention should not be limited thereto, but may include those formed with an even number of such pairs.

Thus, according to the particulate traps in all of the above embodiments, the welded part between both the nonwoven sheets in the central zone of the particulate trap is not separated to individual nonwoven sheets even though they are spirally wound with a small radius of curvature, and particulates in the exhaust gas passing through the central zone can be reliably trapped, resulting in a high particulate-trapping efficiency.

In the first, second, and third embodiments, the difference between the width of the nonwoven sheet and the width of the corrugated plate varies gradually so as to become maximum at the center point of the particulate trap. Therefore, the larger the bending stress of the nonwoven sheets becomes on the basis of the radial position of the particulate trap, the smaller the residual stress of the nonwoven sheets is made. On the other hand, in the fifth embodiment, the length of the welded part between the nonwoven sheets varies gradually so as to become maximum at the center point of the particulate trap. Therefore, the larger the bending stress of the nonwoven sheets becomes on the basis of the radial position of the particulate trap, the larger the reinforcement of the welded part is made.

Although the invention has been described with reference to specific embodiments thereof, it should be apparent that numerous modifications can be made thereto by those skilled in the art, without departing from the basic concept and scope of the invention.

We claim:

1. A particulate trap for a diesel engine, wherein at least two nonwoven sheets made of heat-durable metallic fibers and at least two corrugated plates made of heat-durable metal having a width smaller than that of said nonwoven sheets are alternately overlaid in the thicknesswise direction with each other in a spiral manner, and one surface of one of said nonwoven sheets and one surface of the other of said nonwoven sheets are in close contact and are continuously welded to each other along the upstream edges thereof as seen from the flowing direction of the exhaust gas so that a first space closed along the upstream edges and opened along the downstream edges is formed between said nonwoven sheets via one of said corrugated plates, and the other surface of said one nonwoven sheet and the other surface of said other nonwoven sheet are in close contact and are continuously welded to each other along the downstream edges thereof as seen from the flowing direction of the exhaust gas so that a second space closed along the downstream edges and opened along the upstream edges is formed between said nonwoven sheets via the other of said corrugated plates, characterized in that the difference in width between said nonwoven sheet and said corrugated plate is larger in a central zone of said particulate trap than in the circumferential zone thereof.

2. A particulate trap according to claim 1, wherein said difference varies gradually so as to becomes maximum at the center point of said particulate trap.

3. A particulate trap according to claim 1, wherein the width of said nonwoven sheet is constant.

4. A particulate trap according to claim 1, wherein the width of said corrugated plate is constant.

5. A particulate trap for a diesel engine, wherein at least two nonwoven sheets made of heat-durable metallic fibers and at least two corrugated plates made of heat-durable metal having a width smaller than that of said nonwoven sheets are alternately overlaid in the thicknesswise direction with each other in a spiral manner, and one surface of one of said nonwoven sheets and one surface of the other of said nonwoven sheets are in close contact and are continuously welded to each other along the upstream edges thereof as seen from the flowing direction of the exhaust gas so that a first space closed along the upstream edges and opened along the downstream edges is formed between said nonwoven sheets via one of said corrugated plates, and the other surface of said one nonwoven sheet and the other surface of said other nonwoven sheet are in close contact and are continuously welded to each other along the downstream edges thereof as seen from the flowing direction of the exhaust gas so that a second space closed along the downstream edges and opened along the upstream edges is formed between said nonwoven sheets via the other of said corrugated plates, characterized in that a wave-height of said corrugated plate is smaller in the central zone of said particulate trap than in the circumferential zone thereof.

6. A particulate trap according to claim 5, wherein said wave-height of said corrugated plate varies gradually so as to become minimum at the center point of said particulate trap.

7. A particulate trap for a diesel engine, wherein at least two nonwoven sheets made of heat-durable metallic fibers and at least two corrugated plates made of heat-durable metal having a width smaller than that of said nonwoven sheets are alternately overlaid in the thicknesswise direction with each other in a spiral manner, and one surface of one of said nonwoven sheets and one surface of the other of said nonwoven sheets are in close contact and are continuously welded to each other along the upstream edges thereof as seen from the flowing direction of the exhaust gas so that a first space closed along the upstream edges and opened along the downstream edges is formed between said nonwoven sheets via one of said corrugated plates, and the other surface of said one nonwoven sheet and the other surface of said other nonwoven sheet are in close contact and are continuously welded to each other along the downstream edges thereof as seen from the flowing direction of the exhaust gas so that a second space closed along the downstream edges and opened along the upstream edges is formed between said nonwoven sheets via the other of said corrugated plates, characterized in that a welded length of said nonwoven sheets in the flowing direction of the exhaust gas is longer in the central zone of the particulate trap than in the circumferential zone thereof.

8. A particulate trap according to claim 7, wherein said welded length of said nonwoven sheets varies gradually so as to become maximum at the center point of said particulate trap.

* * * * *